United States Patent [19]

Smith

[11] 4,225,161
[45] Sep. 30, 1980

[54] SPLIT FLANGE ADAPTER PAD

[76] Inventor: Jackson A. Smith, 5443 Rand Rd., Bradner, British Columbia, Canada

[21] Appl. No.: 917,571

[22] Filed: Jun. 21, 1978

Related U.S. Application Data

[63] Continuation-in-part of Ser. No. 841,730, Oct. 31, 1977, abandoned, which is a continuation of Ser. No. 701,172, Jun. 30, 1976, abandoned.

[30] Foreign Application Priority Data

Apr. 15, 1976 [CA] Canada .................................. 250340

[51] Int. Cl.³ .............................................. F16L 3/04
[52] U.S. Cl. .................................... 285/159; 285/177; 285/349
[58] Field of Search ............... 285/177, 189, 159, 336, 285/347, 368, 412, 413, 414, 415, 158

[56] References Cited

U.S. PATENT DOCUMENTS

| | | | |
|---|---|---|---|
| 2,234,119 | 3/1941 | Halliburton | 285/414 X |
| 2,780,092 | 2/1957 | Govan | 285/177 X |
| 2,826,436 | 3/1958 | Hupp et al. | 285/368 X |
| 2,831,708 | 4/1958 | Kircher | 285/336 X |
| 3,125,361 | 3/1964 | Weaver | 285/159 X |
| 3,336,055 | 8/1967 | Pall et al. | 285/368 X |
| 3,549,179 | 12/1970 | Cox | 285/189 |
| 3,761,114 | 9/1973 | Blakeley | 285/415 X |
| 3,865,412 | 2/1975 | Ashton | 285/177 |

FOREIGN PATENT DOCUMENTS 924750 4/1973 Canada ..................................... 285/158

Primary Examiner—Dave W. Arola
Attorney, Agent, or Firm—Fleit & Jacobson

[57] ABSTRACT

An adapter pad is provided for use with an inventive split flange to couple a standard S.A.E. pressure flange coupling to a pressure port requiring a step size flange. The adapter pad has a central flow port therein of a diameter corresponding to the flange coupling inner diameter and has an upper face adapted to interface with the terminal face of the flange coupling head and a lower face has an annular gasket groove therein for connection to a hydraulic component. The upper face of the adapter pad may also be provided with a central circular upraised portion having an inner threaded bore for mating with a standard size fitting, which may have any of the standard angular bends. The inventive split flange is provided with a double circular recess, which forms two shoulders for securing either the standard flange coupling or the flange coupling in combination with the adapter pad.

6 Claims, 5 Drawing Figures

SPLIT FLANGE ADAPTER PAD

BACKGROUND

This is a continuation-in-part of application Ser. No. 841,730, filed Oct. 31, 1977, which is a continuation of Ser. No. 701,172, filed June 30, 1976, both now abandoned.

This invention relates to hydraulic couplings and, in particular, to a disc pad for adapting the flange coupling head of one standard size to a component having a port of the same diameter, but requiring a different size flange coupling head.

The adapter pad of the present invention is used in combination with inventive split flange connectors to attach a high pressure hose assembly to a hydraulic component, such as a pump, manifold, distribution block, or the like. Low, medium, and high pressure S.A.E. fittings differ in external dimensions and port diameters, in order to service pressures ranging up to 6000 lbs. Typically, the working pressure ranges are 250 psi for low pressure, 1500 psi for medium pressure, 2000 psi for high pressure, and 6000 psi for extreme high pressures. Conventionally, if a 3000 lbs. pressure line head is to be attached to a high pressure 3000 lbs. porting having a different flange connection, it is necessary to stock and use a step size flanged hose fitting.

In accordance with the present invention, the adapter pad eliminates the need for stocking all of the various step size hose fittings in all of the various pressure ranges. This permits the supplier to maintain a substantially lower cost inventory, as well as, permitting the manufacturer to need fewer machine set ups. By eliminating all of the step size fittings, the flange coupling cost may be lowered almost 75%. The advantages derived from the present invention are numerous. The pads are universal and will fit any manufacturer's standard couplings and hoses. They are convenient, in requiring less shelf space, and are far less expensive in comparison to the couplings they replace.

In accordance with a broad aspect, the invention relates to a flange pad for adapting hydraulic couplings of one port size to an hydraulic component of the same port diameter size, but which requires a different flange coupling size, i.e., requires a step size flange. The adapter pad comprises a disc having an upper face and a lower face, the upper face is adapted to interface with the terminal end of a coupling head in a face-to-face relation. The upper face may be flush or have a large central bore of the same diameter as the external diameter of the standard fitting, with an upstanding peripheral flange spaced outwardly of and concentric with the central bore.

The conventional flange includes a shoulder for engagement by a standard split flange connector, for securing the flange coupling to the manifold, or the like. When the conventional flange is mated with the inventive adapter, an additional shoulder is formed. The inventive split flange is provided with a double circular recess for engagement with the two shoulders for securing the combination to the hydraulic component. The lower face of the adapter has an annular concentric groove for reception of gasket means therein; and a central port in the adapter pad allows passage of fluid therethrough from the component to the coupling.

The invention is illustrated by way of example in the accompanying drawings, wherein:

DESCRIPTION OF THE PREFERRED EMBODIMENT

Figure 1:
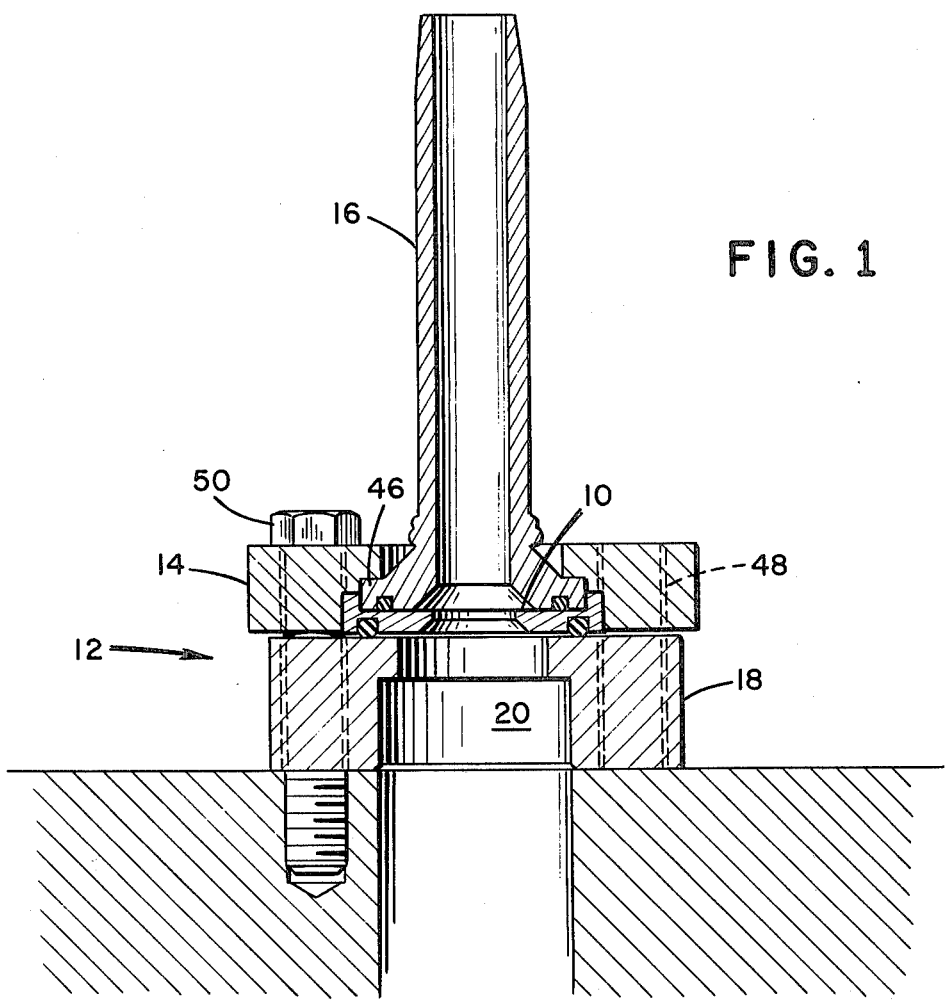
FIG. 1 is an elevational view of, in section, a coupling assembly incorporating the invention.

Referring to FIG. 1, the adapter pad 10 is shown in a coupling assembly 12 incorporating a split flange connector 14 to secure the flange coupling 16 of a hydraulic hose, not shown, to a component 18 having a high pressure port 20. The component 18 may be a conventional weld flange. In this embodiment, adapter pad 10 is of a circular, disc-shape and comprises an upper face 22 and a lower face 24 with a central port 26 through the body of the pad. The diameter of the central port 26 varies in accordance with the standard tube or hose inner diameter. Desirably, though not necessarily, port 26 has a frusto-conical lower wall 28 directed towared the upper face 22.

The upper face 22 is machined to provide a central bore 32 of a diameter to receive the terminal face of the flange coupling 16 and forming a peripheral flange 34 defining a shoulder 36. Thereby making the lower face 24 of the adapter pad the terminal face of the flange coupling. The lower face 24 is machined to provide an annular gasket groove 38 to receive a suitable gasket, such as an O-ring 40, to seal the lower face of the pad 10 to the component 18.

Figure 2:
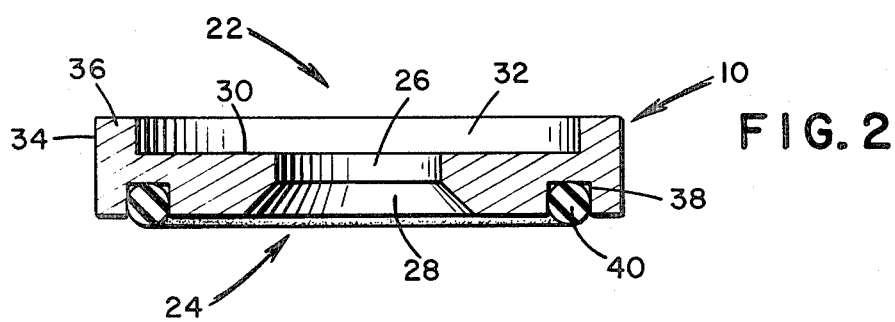
FIG. 2 is a cross-sectional view of the adapter pad of FIG. 1.
Figure 3:
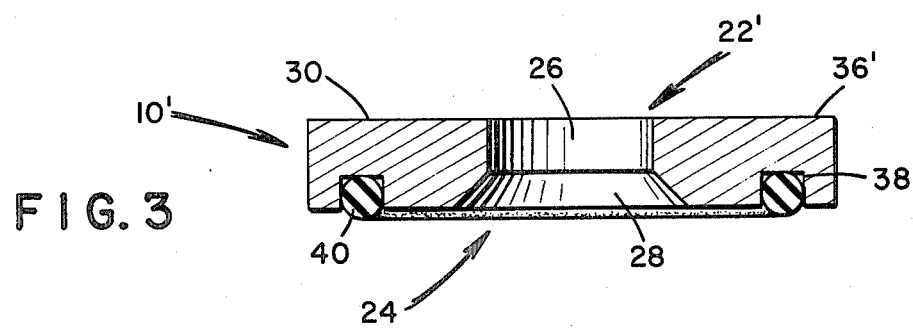
FIG. 3 is a cross-sectional view of an alternate embodiment of the inventive adapter pad.

Alternatively, the adapter pad may be configured as shown in FIG. 3. The lower face 24 of this embodiment 10', of the adapter pad, is identical to the embodiment, as shown, in FIG. 2. However, the upper face 22' is provided with a substantially planar surface 30, which is a smooth surface, and is intended to mate with the gasket element which is already contained in the terminal face of the flange coupling.

Figure 4:
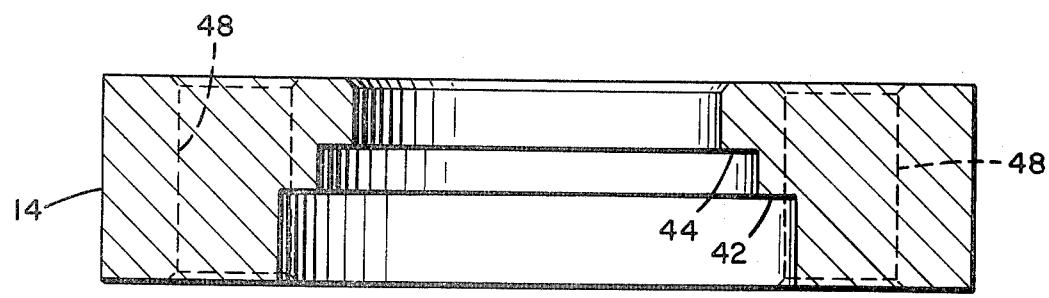
FIG. 4 is a cross-sectional view of the inventive split flange.

The structure of the inventive split flange 14 is shown in FIG. 4. Such flanges are split into two segments and, when together, provide concentric stepped recesses with shoulders 42 and 44 for respective engagement of the shoulder 36 of the adapter pad 10 and flange 46 of the flange coupling 16, shown in FIG. 1.

As shown in FIG. 4, the split flange 14 has holes 48 drilled therein for the passage of the bolts 50 therethrough to secure the flange 14 and the head 16 down onto the pad 10, thereby securing the assembly to the component 18.

In the extreme high pressure series, i.e., the 6000 psi working pressure series, the split flange 14 of FIG. 4 will be increased in thickness. This is to accommodate the difference in diameter and width in the flange coupling shoulders, as dictated by the appropriate S.A.E. specification. Accordingly, in the split flange 14, the shoulders 42 and 44 will also increase in diameter in order to accommodate the thicker adapter pad and the thicker shoulders of the flange couplings.

Figure 5:
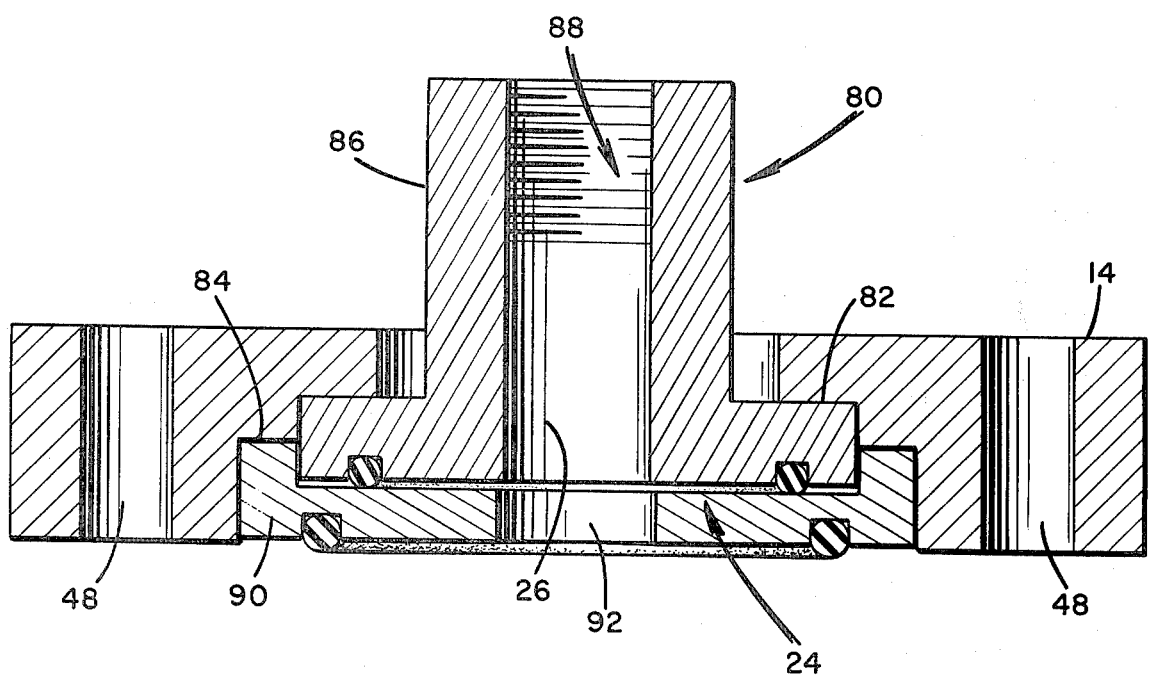
FIG. 5 is a cross-sectional view of another embodiment of the adapter pad and split flange assembly.

Referring now to FIG. 5, a threaded adapter pad is shown. When using the threaded adapter pad 80, a different type of coupling, other than the flange coupling 16 of FIG. 1, will be utilized, specifically, one having a male thread thereon. The lower surface 24 of the threaded adapter pad 80 is substantially identical to the adapter shown in FIGS. 2 and 3. And it is intended to mate with a surface of the element 18. However, the upper surface of the threaded adapter pad 80 is provided with a first shoulder 82 and a second shoulder 84 which may be eliminated; however, is provided for ease in machining, as well as, adding structural strength. The upper surface then has a circular raised portion 86 through which the central bore 26 of the threaded adapter pad is continued. The inner diameter of this central bore, which extends through the upper raised portion 86, is shown generally at 88 and is provided with a machine thread which is compatible with the conventional male couplings. The threaded adapter pad 80 is also provided with an adapter which is similarly to that shown in FIG. 2 and following the mode of the present invention, the threaded adapter pad 80 is formed having a flange which is a standard flange coupling diameter and, when it is desired to utilized such flange in a step size, the additional adapter 90 is provided which has an upper surface which cooperates with the threaded flange 80 and have an inner bore 92 which is at least as large as the inner bore 26 of the threaded pad. Accordingly, the split flange 14, as shown in FIGS. 1 and 4, is then utilized to clamp the threaded adapter and the adapter 90 through the appropriate structure, such as the weld flange 18 of FIG. 1.

What I claim:

1. Adaptor apparatus for fastening an hydraulic flange coupling having a standard size diameter flange to a hydraulic component requiring a step size flange coupling of a diameter larger than said standard size diameter, said adaptor apparatus comprising:
   a metallic disc-shaped adaptor pad having a central port and an upper face having a central recess therein of a diameter substantially equal to said standard size flange diameter for receiving said flange and
   for sealingly contacting the terminal face of said flange coupling and having an external diameter corresponding to the diameter of said step size flange; and
   a pair of split flange halves substantially semicircular in shape and having dual concentric recesses and an axial recess for accommodating said flange coupling, a first one of said dual concentric recesses being of a diameter substantially equal to said step size flange coupling and being adapted to abut the perimeter of said upper face of said disc-shaped adapter pad, a second one of said dual concentric recesses being of a diameter equal to said standard size diameter flange of said flange coupling and being adapted to contact the perimeter thereof, said pair of split flange halves having clearance holes from side to side for fastening means to pass therethrough, so as to securely fasten said flange coupling and said adapter pad to said hydraulic component.

2. The apparatus of claim 1, wherein said adapter pad is formed having a frustoconical lower wall concentric to said central port and directed towards said upper face of said adapter pad.

3. Apparatus for connecting an hydraulic line to an hydraulic component, comprising:
   an adapter pad assembly including a metallic means having a terminal face having an annular concentric groove for reception of gasket means therein and an upper surface in the form of a flange having a diameter substantially equal to a standard size flange and a central upraised cylindrical portion, said adapter pad having a central port therethrough and the inner surface of said port in the area of said cylindrical portion being threaded and a metallic disc-shaped pad means having a central port and a concentric recess of a diameter equal to said standard size flange for receiving said terminal face of said metallic means and a lower face for contacting said hydraulic component and being of a diameter substantially equal to a step size flange larger than said standard size flange;
   a pair of split flange clamp halves having dual concentric recesses and an axial recess for accommodating said cylindrical portion, said dual concentric recesses adapted to abut the perimeters of the upper surfaces of said metallic means and said disc-shaped pad means, respectively;
   said pair of split flange halves having clearance holes from side to said for fastening means to pass therethrough, so as to securely fasten said adapter pad assembly to said hydraulic component;
   whereby said hydraulic line is threadedly engaged with said threaded inner surface of said port.

4. Apparatus for connecting an hydraulic line to an hydraulic component, comprising:
   a flange coupling having a terminal face having an annular concentric groove for reception of gasket means therein and an upper surface in the form of a flange and a central upraised cylindrical portion, said flange coupling having a central port therethrough and the inner surface of said port in the area of said cylindrical portion being threaded, said flange being a standard flange diameter;
   a disc-shaped metallic adapter pad having an upper face for sealingly contacting the terminal face of said flange coupling and having an external diameter corresponding to the diameter of a step size flange larger than the diameter of said flange of said flange coupling;
   a pair of split flange halves having dual concentric recesses and an axial recess for accommodating said flange coupling, having a first recess substantially equal in diameter to said disc-shaped adapter pad and a second recess substantially equal in diameter to said flange of said flange coupling, said dual concentric recesses adapted to abut the perimeter of the upper surface of said disc-shaped adapter pad and the perimeter of the upper surface of said flange of said flange coupling, respectively, said pair of split flange halves having clearance holes from said to side for fastening means to pass therethrough, so as to securely fasten said flange coupling and said adapter pad to said hydraulic component.

5. The disc-shaped adapter pad of claim 4, wherein said upper face is formed substantially planar.

6. The disc-shaped adapter pad of claim 4, wherein said upper face is formed with a central recess of a diameter greater than the diameter of said flange for receiving said flange therein.

* * * * *